United States Patent [19]

Sansing et al.

[11] Patent Number: 4,637,921
[45] Date of Patent: Jan. 20, 1987

[54] PROCESS FOR PRODUCING AMMONIUM POLYPHOSPHATE

[76] Inventors: James E. Sansing, 1709 Eton Ave., Asheboro, N.C. 27203; Byron M. McCarver, 10821 Landsburg, Baton Rouge, La. 70809

[21] Appl. No.: 726,351

[22] Filed: Apr. 19, 1985

Related U.S. Application Data

[63] Continuation-in-part of Ser. No. 449,052, Dec. 13, 1982, abandoned.

[51] Int. Cl.$^4$ ............... C01B 15/16; C01B 25/26; C01B 25/16
[52] U.S. Cl. ............... 423/315; 423/310; 423/313; 423/317; 423/321 R; 71/43
[58] Field of Search ............ 423/316, 317, 319, 320, 423/321 R, 321 S, 310, 313, 315; 159/4 A, 4 CC, 48.2, DIG. 2, DIG. 19; 71/43

[56] References Cited

U.S. PATENT DOCUMENTS

| | | | |
|---|---|---|---|
| 3,044,855 | 7/1962 | Young | 423/316 |
| 3,317,306 | 5/1967 | Getsinger et al. | 159/DIG. 19 |
| 3,671,202 | 6/1972 | Esterhoy et al. | 23/307 |
| 3,988,140 | 10/1976 | Burns et al. | 423/310 |
| 4,364,912 | 12/1982 | Hill | 423/321 R |

Primary Examiner—Gregory A. Heller
Attorney, Agent, or Firm—William T. Hough

[57] ABSTRACT

An improved process of concentrating wet process phosphoric acid by continuously contacting an acid feed containing at least about 56 weight percent of $P_2O_5$ based on the total weight of the feed with heated gases consisting of air and gaseous fuel combustion products thereby forming a mixture of said gases containing entrained superphosphoric acid particles, continuously coalescing said mixture in a coalescence zone forming coalesced superphosphoric acid and continuously removing the coalesced superphosphoric acid from said coalescence zone.

3 Claims, 2 Drawing Figures

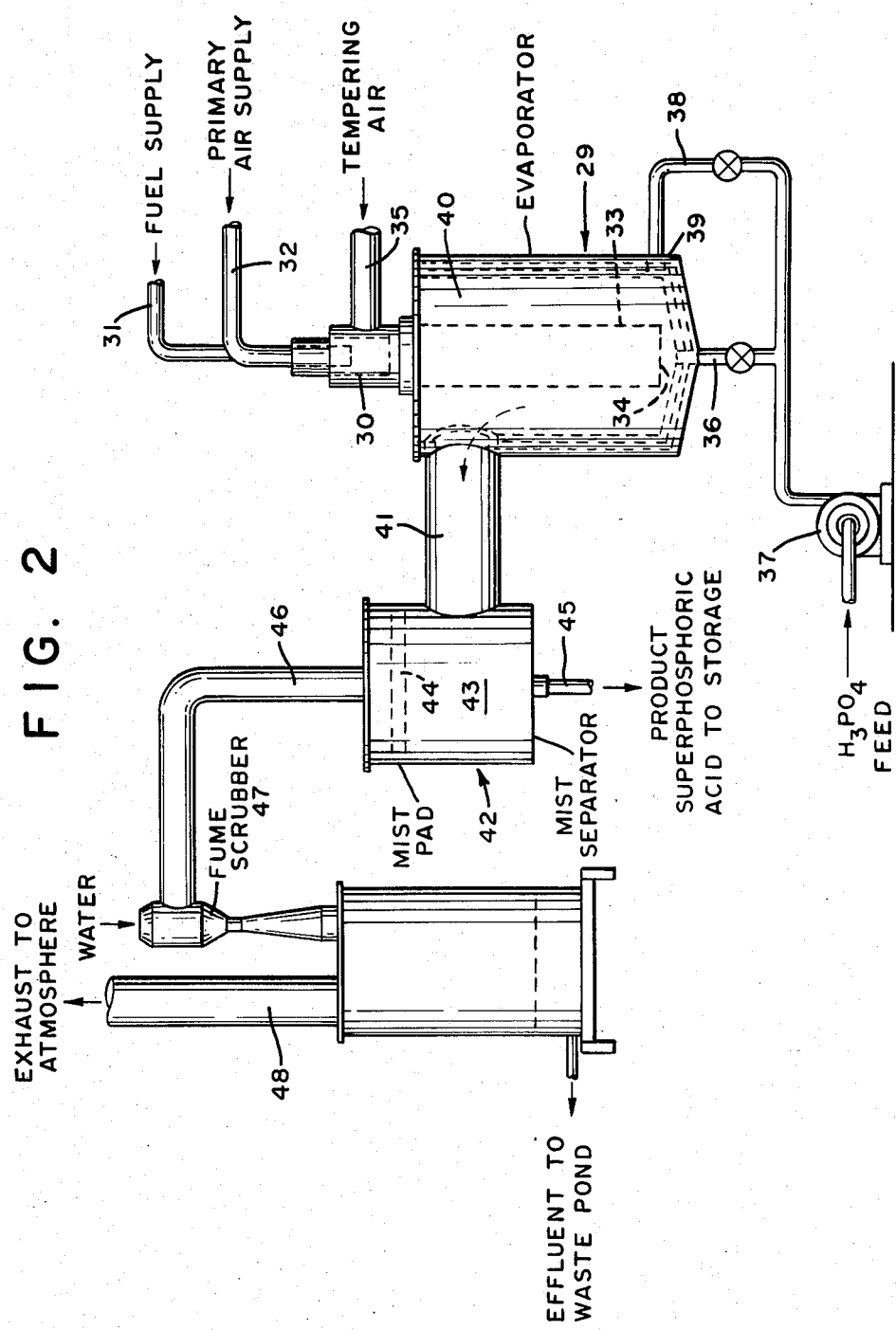

PROCESS FOR PRODUCING AMMONIUM POLYPHOSPHATE

This application is a continuation-in-part application of copending U.S. Ser. No. 06/449,052 filed Dec. 13, 1982 under the same title, now abandoned.

This invention relates to a process of concentrating orthophosphoric acid. More particularly, this invention relates to a process of concentrating orthophosphoric acid prepared by the wet process to provide superphosphoric acid containing more than about 65 weight percent polyphosphates.

BACKGROUND TO THE INVENTION

Wet-process orthophosphoric acid is commonly produced by treating phosphate rock with a strong mineral acid, usually sulfuric acid. Wet-process orthophosphoric acid which contains about 55 weight percent $P_2O_5$ has a boiling point of about 300 degrees Fahrenheit and is a viscous liquid in which all of the phosphate is in the ortho form. There are many disadvantages associated with the use, transportation and storage of ortho-phosphoric acid. For example, there are significant storage and transportation cost associated with ortho-phosphoric acid because of the high water content. Furthermore, liquid fertilizers of high $P_2O_5$ analysis cannot be made with orthophosphoric. Because of these disadvantages, orthophosphoric acid is usually converted into superphosphoric acid, i.e. phosphoric acid containing at least about 60 weight percent of the total $P_2O_5$ in the polyphosphate form.

There are basically three methods that have been used either commercially or semi-commercially to evaporate wet-process orthophosphoric acid from its normal commercial strength to higher ortho-content of superphosphoric acid. At about 67% $P_2O_5$, wet process phosphoric acid becomes more or less an anhydrous form, and as the concentration is increased by water loss above about 67% above-noted, the water comes from condensing or polymerizing the phosphoric acid to poly-phosphates.

One mode of converting orthophosphoric acid into superphosphoric acid is boiling. As orthophosphoric acid is boiled, it is concentrated by evaporation of water, forming superphosphoric acid. During the boiling procedure, the orthophosphoric acid becomes more viscous. Currently in the United States of America, the largest amount of superphosphoric acid (acid containing polyphosphate) is produced in recirculating vacuum evaporators heated with high pressure steam or hot oil. The equipment is made of the most corrosion-resistant metal alloys available. The concentration of the product from these evaporators is dependent on the temperature and pressure (vacuum) that the equipment can tolerate or generate—the product strength is independent of the strength of acid used as a feed, although 54% $P_2O_5$ is normally used. Many years of experience indicate that these evaporators can operate only over a very narrow range, i.e. 68–71% total $P_2O_5$ and 10%–40% poly-phosphate in the product. There are several disadvantages associated with the production of superphosphoric acid by concentration of orthophosphoric acid through boiling. For example, boiling orthophosphoric acid is highly corrosive and its handling during concentration presents a number of difficult problems because of the presence of fluorine containing compounds, its highly corrosive properties, its high viscosity and the like.

A second type evaporator which has been used only semi-commercially and not at all at the present time, is the submerged combustion evaporator. A necessary feature of submerged combustion is that the reactor vessel must at all times contain a pool of the liquid being evaporated and hot gases are introduced well under the surface of the pool. The evaporation occurs from the pool and the concentrated product is withdrawn from the pool. This is the type of evaporation taught by the Getsinger Pat. No. 3,317,306 (U.S. Patent). The submerged combustion process was used for several years during the mid to late 1960's by Occidental Chemical Co., USS Agricultural Chemical Co., and Swift company. Occidental operated the largest plant, and for the longest time; that company published literature and sold semicommercial quantities. That process failed for several reasons: (1) attempts to scale up to larger, more economical units failed; (2) the units plugged with solids rapidly due to long residence time of 10 to 30 minutes and had to be shut down and cleaned out during shutdown every two or three days. The frequent shutdowns coupled with a restart time of about 4 hours gave very poor production rates. The highest polyphosphate these units ever achieved was about 55% and by 1970 the market was demanding over 60% polyphosphate in a premium ammonium polyphosphate product which these units could not provide. This process of the submerged combustion for converting wet-process orthophosphoric acid into superphosphoric acid results in a total product of about 70% $P_2O_5$ of which less than 55% is polyphosphate form as noted-above, and is disclosed in Volume 53, No. 9, September 1961 of Industrial and Engineering Chemistry. In this process, the wet-process orthophosphoric acid is introduced beneath the surface of a pool of the acid. Combustion products are also introduced into the pool of acid through a submerged burner. Superphosphoric acid containing a mixture of ortho and polyphosphoric acids is withdrawn at a fixed level above the pool of acid into an entrainment separator where acid mists are coalesced and the resultant superphosphoric acid flows by gravity to the product sump. Exit gases from the entrainment separator are scrubbed with water and the gas exiting from the scrubber are exhausted to the atmosphere. This submerged burner process of converting wet-process orthophosphoric acid into superphosphoric acid has several disadvantages. For example, start-up periods for this process are prolonged unduly. From 3 to 6 hours are required to attain equilibrium conditions to produce the desired strength of superphosphoric acid. Another disadvantage of this process is that insolubles are formed (due probably to the relatively long residence time of the acid within the pool and for also other reasons) which contaminate the superphosphoric acid product. Another disadvantage of this submerged combustion method is that the superphosphoric acid produced by the process invariably has such a high percentage fluoride content that it cannot be used as a raw material for the production of feed grade products. Still another disadvantage is that the concentration of the non-orthophosphoric acid component, i.e., the polyphosphates, in the product acid fluctuates as variations occur in the distribution of the hot gas within the pool of liquid being concentrated. Moreover, another disadvantage of the process is that the superphosphoric acid produced by the process when the concentration is effected at an acid pool temperature of about 500 degrees Fahrenheit, contains significantly large amounts of the orthophosphoric acid, usually about 50% of the total $P_2O_5$ in the acid product, whereby polyphosphate content is normally about 50% or less.

A third type commercial evaporator to produce superphosphoric acid is the hot gas entrainment as described by Esteroy in U.S. Pat. No. 3,671,202. Only subsequent to the filing of the Esteroy U.S. patent did it become known to produce commercial ultra-filtered orthophosphoric acid that thereby feed-acid can have a commercial strength greater than about 50% to about 55% $P_2O_5$ orthophosphoric acid content. An incorrect assumption would be that $P_2O_5$ polyphosphate content of a product is directly proportional to $P_2O_5$ concentration of feed orthophosphoric acid; to the contrary, the concentration of the polyphosphate product from evaporators of the type used for the process of Esteroy, is completely independent of strength of the feed orthophosphoric acid used. In fact, the product concentration (% of total $P_2O_5$ weight content) in resulting superphosphoric acid is dependent upon the temperature that the equipment can tolerate or generate; even Esteroy patent acknowledges this, that it is dependent upon temperature. This type process, such as of Esteroy, is a process in which the wet-process orthophosphoric acid is fed continuously into an evaporation zone where it is contacted with heated gases having a temperature of from 600 degrees Fahrenheit to about 1800 degrees Fahrenheit, preferably from about 700 to 1400 degrees Fahrenheit. The amount and velocity of the gas is controlled relative to the amount of wet-process orthophosphoric acid so that the acid is entrained in the gas stream in the form of droplets. The resultant hot gas stream carrying the entrained particles of acid and water vapor is passed continuously through a second zone where the liquid droplets are coalesced and the desired liquid superphosphoric acid is withdrawn. The lean gases, i.e., the heating gases from which the superphosphoric acid has been separated, are quenched, scrubbed with water and the uncondensed gases leaving the scrubber disposed of in any desired manner, as for example, by discharge into the atmosphere. This type process also suffers from a number of inherent disadvantages. For example, while the patent states generally that an acid product in which up to 72 weight percent of the $P_2O_5$ is in the form of superphosphoric acid that can be prepared, other patents have indicated that experimentation has demonstrated that in actual fact the weight percent of superphosphoric acid in the product is considerably lower. Still another disadvantage associated with this process is that increased sold deposition occurs which results in frequent stops in production so that solids can be removed from process hardware. Yet another disadvantage of this process is that fluorides are emitted into the atmosphere which could possibly result in an adverse impact on the environment. The Esteroy patent illustrates and discloses that utilizing a process step-wise substantially similar to that of the present invention, the percentage of total $P_2O_5$ of a superphosphoric acid product will be increased within a product-range of from about 74% total $P_2O_5$ (from a feed having 50% (Ex.I) and 53.5% respectively of $P_2O_5$) to 80% (allegedly) total $P_2O_5$ (from a feed of orthophosphoric acid having (allegedly) 74% total $P_2O_5$ by weight. Estroy patent at-length points-out that the product bears a direct proportional relationship to an increase in termerature of reaction—the higher the temperature in the vapor space, the greater the non-ortho proportion of $P_2O_5$. It is pertinent to point out that not only does Esteroy repeatedly state this fact, that it is solely with regard to increasing the temperature to increase the total percentage as well as the non-ortho percentage of $P_2O_5$, there is nothing to the contrary nor about any other way of making such increase, nor whether such increase is the sole answer; the sole feeds disclosed or mentioned in that patent are the above-noted Examples I and II thereof at 50 percent and 53.5 percent respectively.

Getsinger U.S. Pat. No. 3,317,306 relates to the submerged combustion evaporator in which the reactor vessel contains a pool of liquid being evaporated by virtue of hot gases as above noted, such being totally different and distinct and in no way related to the present invention nor to the method of the Esteroy patent, being totally non-analagous.

Young U.S. Pat. No. 3,044,855 is unrelated to the present invention, that patent disclosing solely (and nothing more) that addition of ammonium ion prevents "foaming" in a type of process employing the unrelated above-noted submerged combustion evaporator of the type disclosed by Getsinger patent above noted. Prevention of foaming in a submerged combustion evaporation method has heretofore constituted a major concern, the Young patent having nothing to do with ammoniating of a superphosphoric acid in a method that does not even relate to a submerged combustion evaporator. Foaming is not a consideration in the process of Esteroy patent.

Only in years subsequent to the filing of the Esteroy patent did it eventually become known to produce commercial ultra-filtered orthophosphoric acid that thereby can have a commercial strength greater than about 50 to 55% $P_2O_5$ content. Moreover, there is no prior art with regard to orthophosphoric acid of such higher concentration of $P_2O_5$.

SUMMARY OF THE INVENTION

In accordance with this invention there is provided an improved process of converting wet-process orthophosphoric acid into superphosphoric acid, said process of the type which comprises continuously feeding the said wet-process orthophosphoric acid into an evaporation zone, continuously contacting the wet-process orthophosphoric acid with an oppositely directed stream of heated gas comprising air and gaseous fuel combustion products in a volume and at a velocity to entrain as particles in the gas stream all or a major portion of the wet-process orthophosphoric acid fed into the evaporation zone and to maintain substantially no acid level in the zone, continuously feeding the stream of heating gas containing the entrained orthophosphoric acid into a coalescence zone, continuously effecting coalescence of the entrained acid particles without cooling the stream more than about 10 degrees Fahrenheit below the temperature of the evaporation zone to produce superphosphoric acid from the last mentioned zone and continuously removing the residual gas from the last mentioned zone, wherein the improvement comprises a wet-process orthophosphoric acid feed containing at least about 56 weight percent $P_2O_5$ based on the total weight of the acid. Several unexpected benefits are provided by the improvement of this invention. For example, the increased $P_2O_5$ concentration in the wet-process orthophosphoric acid feed provides for reduced gas consumption. A further unexpected advantage provided by the improvement of this invention is an increased superphosphoric acid production rate. Yet another unexpected result provided by the improvement of this invention is increased superphosphoric acid content in the acid product.

In contrast to the Esteroy prior art, Applicant's invention illustrates as high as 75% non-ortho content. For that percent, the total product was 74% $P_2O_5$. For the present invention, the product as produced from the higher-percentage feed, a characteristic of the product is that even at $P_2O_5$ total content as low as 68% it remains substantially corrosive-free—i.e. the substance of the Specification-stated objects and especially for the preferred embodiment, as well as there being the additional benefit at such low required percentage that it is much less viscous, especially from the point noted-above of pipes of pipe-reactors not being able to use such a product having 72% or more total $P_2O_5$ content because of too great viscosity. The objects obtained by the present invention, aside from the above, include: (1) a coalescenced superphosphoric acid having a substantially low concentration therein of ortho $P_2O_5$, together with (2) a substantially low degree of emissions of fluoride. It is pointed out that these benefits are obtained or imparted by virtue of the novel process; without such process limitations the benefits will not be obtained; i.e. the process limitations are clearly critical to obtain the inventive benefits. Particular criticality lies in the weight percent of $P_2O_5$ fed into the evaporator, such being critical to obtain the advantages/objects of this invention. In addition to the present invention as set-forth herein inclusive of these critical limitations and patentably distinct from prior art, but additionally the Esteroy patent itself states that total $P_2O_5$ produt content of the superphosphoric acid depends on temperature, in fact projecting the higher $P_2O_5$ content of 80% from Esteroy feed of (illustrated in Esteroy) 50% and 53.5% content of $P_2O_5$; it is the combination of process limitations, as viewed by different results that characterize the invention of present inventors. In the prior art process in which the concentration of $P_2O_5$ in the wet-process orthophosphoric acid feed is from about 50 to about 55 weight percent, it is practically impossible to increase superphosphoric acid content in the acid product to an amount equal to or more than about 68 weight percent. However, through use of the process of this invention, acid products having superphosphoric acid contents equal to or greater than about 70 weight percent are easily obtained. Still another unexpected advantage of the process of this invention is that solids deposition is significantly reduced which provides a concomitant reduction in the number of unit clean-outs required. Yet another unexpected advantage of the process of this invention is the reduction in fluoride emissions into the environment of up to about one half. The foregoing and other advantages and objects of this invention become apparent from the following detailed description of this invention.

In the past prior art, for a method of producing ammonium polyphosphates, a phosphoric acid having 72% or more of $P_2O_5$ content in superphosphoric acid at 72% is characterized as having too great a viscosity (too viscous) to be used in a feed-pipe of a pipe-reactor. In contrast to the pipe-reactor method, the present invention's non-ortho content of superphosphoric acid product is illustrated as high as 75%, as contrasted to Esteroy patent's "highest" non-ortho-content of merely up to 72% when the total content (for Esteroy) was 79–80% $P_2O_5$. For the 50% and 53% $P_2O_5$ ortho-content-orthophosphoric acid utilized by Esteroy patent, conventional commercial steam heated evaporators would be required to operate at temperatures that would produce a product within a "narrow" range of at least 71% ortho-content $P_2O_5$ because of severe corrosion at less percentages such that, the (that) magnitude and intensity of corrosion requires repairs after every twenty-four hours of running the Esteroy process. It would have to be operated to produce a product of total content of not more than 76% $P_2O_5$ content because of severe pluggage problems at higher percentages. In contrast, the Esteroy's highest illustrated ortho-content was 53.5 $P_2O_5$ for feed acid and highest possibility mentioned as a product was up to 80% which has too high a viscosity. Of equal importance, the Esteroy patent did not recognize nor suggest nor teach any reasons for desiring or utilizing orthophosphoric acid having an ortho-content of 58% or more of $P_2O_5$ as a feed for producing concentrated or superphosphoric acid. Present inventors' invention utilizes a preferred feed orthophosphoric acid having an ortho-content of at least 58 or 59% $P_2O_5$. This preferred minimum content is important—using such higher percentage acid as feed resulting in the feed acid remaining corrosive-free (substantially) at $P_2O_5$ content as low as 68%, as compared to the above-noted 71%; i.e., there is substance to the present invention's preferred range in obtaining non-corrosive objects. At that low 68%, there is the additional advantage of lower viscosity, as contrasted to the prior art. The present inventor's process's weight percent of ortho-content of feed orthophosphoric acid, is critical; additionally, for several reasons set forth above, it is solely the present inventors who have discovered this criticality for the benefits above disclosed, including the fact of low emmissions of fluoride and including the fact of low solids deposits.

THE FIGURES

FIG. 2 is a flow sheet of a preferred arrangement of equipment for practicing the process of this invention.

DETAILED DESCRIPTION OF PREFERRED EMBODIMENTS

Figure 1:
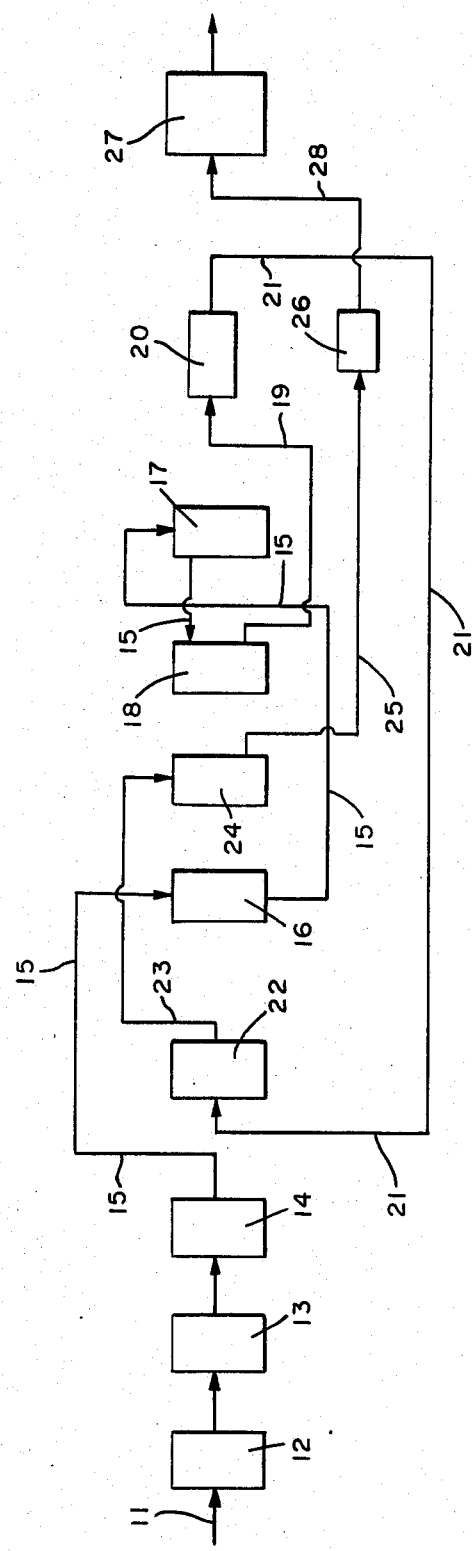
FIG. 1 is a flow sheet of a preferred arrangement of equipment for manufacturing wet-process phosphoric acid having a $P_2O_5$ content of at least about 56 weight percent from dilute wet-process phosphoric acid.

Reference is made to FIG. 1 which is a flow diagram of a process for forming wet-process phosphoric acid having a $P_2O_5$ content of greater than 56 weight percent. Dilute wet-process orthophosphoric acid prepared by the digestion of phosphate rock with an aqueous phosphoric acid solution containing about 29 weight percent $P_2O_5$ is fed via line 11 into evaporators 12, 13, and 14 in series. In these evaporators a substantial amount of water is removed from the solution resulting in an increase in the $P_2O_5$ content of the solution to about 50 weight percent. The partially concentrated solution is then fed via line 15 into settlers 16, 17 and 18 where magnesium and other metal precipitates formed because of the increased $P_2O_5$ content coagulate. The phosphoric acid/coagulated precipitate mixture is fed via line 19 to filter 20 where the solid coagulated impurities are removed. The phosphoric acid solution is then conveyed via line 21 to evaporator 22 where additional water is removed to form a solution having at least about 56 weight percent $P_2O_5$. This 56 weight percent $P_2O_5$ solution is conveyed via line 23 to settler 24 where additional metal precipitates formed during the evaporation step are allowed to coagulate. The phosphoric acid solution/coagulated solids mixture is conveyed via line 25 to filter 26 where the metal precipitates are removed. The 56 weight percent $P_2O_5$ orthophosphoric acid solution is then conveyed to superphosphoric acid generation unit 27 by way of line 28. In the preferred embodiment of this invention, the orthophosphoric acid solution is mixed with up to about 0.3 weight percent ammonia based on the total weight of the solution, preferably the anhydrous form prior to feeding into generation unit 27. When ammonia is added to the superphosphoric acid product is in the ammonium polyphosphate form.

Superphosphoric acid generation unit 27 is depicted in FIG. 2. In general, superphosphoric acid generation unit 27 operates as follows. The wet-process phosphoric acid containing at least about 56 weight percent $P_2O_5$, and preferably at least about 57 weight percent $P_2O_5$ which is preferably produced in accordance with the procedure of FIG. 1 and which optionally may contain up to about 0.8 weight percent is fed continuously into evaporation zone 29 where it is contacted with heated gases. Illustrative of useful gases are tempered combustion products having a temperature of from about 600 degrees Fahrenheit to about 1800 degrees Fahrenheit and preferably from about 700 degrees to about 1400 degrees Fahrenheit. The amount and velocity of the heated gas is controlled relative to the amount of wet-process orthophosphoric acid supplied so that all of the acid is entrained in the gas stream in the form of acid droplets. This droplet retention usually takes place within a retention time of the acid in the evaporation zone of not more than about 5 seconds, preferably not more than about 2 seconds. The resultant hot gas stream carrying the entrained particles of acid and water vapor is passed continuously through a second zone where the orthophosphoric acid droplets are coalesced. The liquid superphosphoric acid thus produced can then be withdrawn from the second zone as product. The lean gases, i.e., the heating gases from which the superphosphoric acid has been separated, are quenched, scrubbed with water and the uncondensed gases leaving the scrubber diaposed of in any desired manner, as for example by discharging into the atmosphere.

The second zone in which the liquid droplets are coalesced is desirably maintained at substantially the same temperature as the vapor space in the evaporator or concentration zone. This is readily effected by passing the hot gases containing the entrained superphosphoric acid through the second zone, without cooling except as such cooling is inherent in heat loses resulting from radiation of heat from the equipment. Operating in this manner, the temperature in the second zone is from about 5 degrees Fahrenheit to about 10 degrees Fahrenheit below that in the vapor space of from about 475 degrees Fahrenheit to about 600 degrees Fahrenheit, preferably from about 540 degrees to about 550 degrees Fahrenheit. If desired, however, the second zone in which the coalescence of the superphosphoric acid droplets takes place or the stream of heating gases containing the entrained droplets of superphosphoric acid can be cooled to effect condensation of the superphosphoric acid. Such cooling should be effected under controlled conditions to produce superphosphoric acid having a relatively high content of polyphosphates. In general, cooling to a temperature below about 475 degrees Fahrenheit of either the hot gas stream or the second zone where coalescence of the droplets of superphosphoric acid is effected should be avoided.

A more detailed description of the operation of superphosphoric acid generation unit 27 is as follows. As is depicted in FIG. 2, unit 27 includes an evaporator 29 in the form of a cylindrical or other shaped vessel, desirably a stainless stell vessel lined with carbon-brick. Communicating with the top of evaporator 29 is a combustion chamber 30 provided with a fuel gas inlet 31 for supplying fule gas, such as natural gas or other heating medium, to the combustion chamber 30. Air to support combustion of the fuel is supplied through a line 32. A downcomer 33 communicates with the combustion chamger 30 and extends to discharge outlet 34 located near the base of the evaporator 29. Tempering air is supplied through pipe 35 to the heating gases exiting from combustion chamber 30 into the downcomer 33.

Wet-process orthophosphoric acid is fed continuously into the base of evaporator 29 through a valve controlled line 36, communicating with pump 37. The weight percent of $P_2O_5$ in the wet-process ortho-phosphoric acid fed into evaporator 29 is critical for the advantages of this invention. The weight percent $P_2O_5$ should be at least about 56 based on the total weight of the wet-process orthophosphoric acid feed, and in the preferred embodiments of this invention the weight percent $P_2O_5$ is at least about 57 on the same weight basis. The weight percent $P_2O_5$ in the particularly preferred embodiments is at least about 58 on the above-referenced basis. Line 36 discharges the acid upwardly along the longitudinal axis of the evaporator 29 in a direction opposite to the discharge of tempered heating gases from downcomber 33 through outlet 34 the axis of which is coincident with that of evaporator 29. Valve-controlled line 38 permits the supply of wet-process orthosphosphoric acid into the base of evaporator 29 through pot 39 positioned at the periphery of evaporator 29. Line 36 is the preferred inlet for the wet-process orthophosphoric acid; however, both lines 36 and 38 can be used for supply of the acid to evaporator 29. At the same time the products of combustion in chamber 30 are mixed with tempering air and are introduced into evaporator 29 by way of inlet 34. The mixing rate is controlled to provide a temperature of from about 600 degrees Fahrenheit to about 1800 degrees Fahrenheit, preferably from about 700 degrees Fahrenheit to about 1400 degrees Fahrenheit, in downcomber 33 at a suitable control point desirably located a distance from the top of downcomer 33 equal to from ½ to ¾ the length of downcomer 33 at a velocity of from about 50 to about 250 feet per second, preferably from about 70 to about 200 feet per second. No liquid orthophosphoric acid is maintained within the evaporator 29, all liquid acid is entrained in the flowing heating gas stream as it enters evaporating zone 29. The resultant stream of heating gas carrying the entrained orthophosphoric acid flows through annular vapor space 40 into the liquid coalescing zone or mist separator 42. Operating in this manner, the temperature in vapor space 40 is within the range of from about 475 degrees Fahrenheit to about 600 degrees Fahrenheit, preferably from about 540 degrees to about 550 degrees Fahrenheit, and the velocity of the heating has carrying the entrained liquid particles through vapor space 40 is from about 0.75 to about 10 feet per second, preferably from about 3.5 to about 8 feet per second. The retention time of the acid in the evaporating zone does not exceed about 5 seconds and preferably is less than about 2 second.

The rate of feed of the acid is correlated with the velocity and volume of air tempered combustion products exiting from downcomer 33 so that all the acid is entrained in the combustion products exiting from downcomer 33 and flowing into annular vapor space 40 which surrounds downcomer 33. Annular space 40 is defined by the inner walls of evaporator or concentrator 29 and the outer walls of downcomer 33. The superphosphoric acid laden gases flow through line 41 into mist separator 42, which in the embodiment shown in FIG. 2 comprises a cylindrical or other shaped carbon-brick lined stainless steel vessel 43 having at its top a mist pad 44. Pad 44 consists of stainless steel wool having a density of from about 9 to about 11 pounds per cubic foot arranged to provide a layer or thickness from about 6 inches to about 12 inches, preferably about 6 inches positioned at the top of mist separator 42 as depicted in the drawing. As the superphosphoric acid laden gases flow through the stainless steel wool, droplets of superphosphoric acid coalesce and flow by gravity to the base of mist separator 42 exiting therefrom through discharge line 45 into a storage tank where it can be cooled prior to use. Mist separator 42 shown for purposes of exemplification represents a preferred type of equipment for effecting coalescence of droplets of acid carried by the heated gas stream. It should be appreciated that any suitable equipment for coalescing liquid particles, which is resistant to corrosion, can be used. In the preferred embodiment, the superphosphoric acid laden gases which pass through mist separator 42 without cooling are at a temperature of from about 5 degrees Fahrenheit to about 10 degrees below that of vapor space 40. Lean heating gases from which the droplets of superphosphoric acid have been removed are exhausted from mist separator 42 through line 46 leading into fume scrubber 47 of any known type. The lean gases are quenched and scrubbed in scrubber 47 and the gases are suitably disposed of, as for example, by exhaustion to the atmosphere through exhaust duct 48.

The following examples are given to illustrate a preferred practice of the process of this invention. It will be appreciated, however, that the invention is not limited to these examples.

EXAMPLES 1 to 7

General Procedure

Wet process orthophosphoric acid is mixed with anhydrous ammonia, and the mixture is fed into superphosphoric acid generator 27. Heating gases produced by the combustion of heating gases and containing tempering air is fed to the downcomer 33. All of the acid is evaporated upon contact with the hot gases; and no body of liquid is formed in the evaporator 29. The heating gases laden with super-phosphoric acid droplets passed through mist separator 42 and the gases and acid droplets are separated. The droplets coalesce and the coalesced superphosphoric acid droplets are continuously removed from the mist separator 42 and are analyzed for polyphosphate content. Lean gases from mist separator 42 are fed into fume scrubber 47, where fluoride impurities are removed and the scrubbed gases vented to the atmosphere.

Employing the above general procedure, several experiments can be conducted to illustrate the process and product of this invention. The results and process conditions of these experiments are set forth in the following Table I.

TABLE I

|  |  | 1 | 2 | 3 | 4 | 5 | 6 | 7 |
|---|---|---|---|---|---|---|---|---|
| (a) | % $P_2O_5$ in acid feed | 50 | 52 | 55 | 57 | 57 | 59 | 59 |
| (b) | % $NH_3$ in acid feed | 0 | 0 | 0 | 0 | 0.30 | 0 | 0.30 |
| (c) | Natural gas heat input, BTU $\times 10^6$/ton $P_2O_5$ | 1.5 | 1.4 | 1.25 | 1.25 | 1.10 | 1.05 | 1.00 |
| (d) | Product acid by wt. (i) total $P_2O_5$ | 71 | 72 | 73 | 73.5 | 73 | 74.5 | 74 |
|  | (ii) non-ortho $P_2O_5$, % of total $P_2O_5$ | 63 | 65 | 68 | 71 | 73 | 74 | 75 |
|  | (iii) $F^-$ | 0.23 | 0.22 | 0.21 | 0.20 | 0.20 | 0.19 | 0.19 |
| (e) | $F^-$ emissions | 600 | 550 | 400 | 350 | 350 | 325 | 325 |
| (f) | $P_2O_5$ thruput, tons per day | 620 | 700 | 940 | 1100 | 1100 | 1250 | 1250 |
| (g) | days of operation between solids clean-outs | 21 | 22 | 28 | 34 | 30 | 36 | 32 |

It will be noted from the data in the above table that the product of this invention results in a product having higher non-ortho $P_2O_5$ concentrations as compared with the product prepared by the process of U.S. Pat. No. 3,671,202. Furthermore, the results set forth in Table I show that the level of fluoride emissions and gas consumption are lower when the process of this invention is used. Moreover, the data in Table I indicates that through use of the process, higher through-put of $P_2O_5$ can be obtained as compared to the prior art processes. Lastly, Table I shows that solid deposition is significantly reduced by the process of this invention, which provides a concomitant reduction in the number of unit clean-outs required.

We claim:

1. A process for producing ammonium polyphosphate, comprising in combination: sufficiently evaporating water from feed wet process phosphoric acid solution containing total $P_2O_5$ at a percentage substantially below about 50% by weight, such that phosphoric acid is obtained having a total $P_2O_5$ content of about 50% by weight; thereafter settling and removing coagulated-precipitate impurities therefrom; thereafter further evaporating therefrom additional water sufficiently to obtain an ortho-phosphoric acid having a total $P_2O_5$ content of at-least about 58% by weight of which a predominant proportion thereof is ortho-$P_2O_5$, thereafter settling and removing coagulated-precipitate impurities therefrom; thereafter mixing said ortho-phosphoric acid with anhydrous ammonia sufficiently to form a mixture, and introducing and treating said mixture in a pipe reactor by way of a feed pipe thereof, said introducing and treating consisting essentially of continuously first-feeding a feed of said mixture into a pipe reactor's evaporation zone while maintaining said evaporation zone at a predetermined temperature within a range of from about 475 degrees Fahrenheit to about 600 degrees Fahrenheit, and simultaneously continuously second-feeding an oppositely directed stream of heated gases consisting essentially of air and gaseous fuel combustion products into contact with said feed within said pipe reactor's evaporation zone at a volume and velocity of said gases at a velocity of from about 0.75 ft./sec. to about 10 ft./sec. such that said feed is entrained in said gas stream as entrained feed within said evaporation zone for a period up to about 5 seconds, said velocity being correlated with rate of said first-feeding, and thereafter continuously passing said entrained feed as a stream through a coalescence zone without cooling said stream more than about 10 degrees below said predetermined temperature sufficiently to produce a product comprising (a) ammonium polyphosphate thereof, of at least about 70% to about 74% of total $P_2O_5$ by weight of which non-ortho $P_2O_5$ is between about 71% and 75% by weight, and (b) an emmission of fluoride of low emmission, and continuously removing said ammonium polyphosphate and said emision from said coalescence zone.

2. A process for producing ammonium polyphosphate, consisting essentially of: introducing and treating a mixture of ammonia and an ortho-phosphoric acid having a total $P_2O_5$ content of at-least about 58% by weight of which a predominant preportion thereof is ortho-$P_2O_5$ and from which coagulated-precipitate impurities have been removed therefrom, in a pipe reactor by way of a feed pipe thereof, said introducing and treating consisting essentially of continuously first-feeding said feed into a pipe reactor's evaporation zone while maintaining said evaporation zone at a predetermined temperature within a range of from about 475 degrees Fahrenheit to about 600 degrees Fahrenheit, and simultaneously continuously second-feeding an oppositely directed stream of heated gases consisting essentially of air and gaseous fuel combustion products into contact with said feed within said pipe reactor's evaporation zone at a volume and velocity of said gases at a velocity of from about 0.75 ft./sec. to about 10 ft./sec. such that said feed is entrained in said gas stream as entrained feed within said evaporation zone for a period up to about 5 seconds, said velocity being correlated with rate of said first-feeding, and thereafter continuously passing said entrained feed as a stream through a coalescence zone without cooling said stream more than about 10 degrees below said predetermined temperature sufficiently to produce a product comprising (a) ammonium polyphosphate, of at least about 70% to about 74% of total $P_2O_5$ by weight of which non-ortho $P_2O_5$ is between about 71% and 75% by weight, and (b) an emission of fluoride of low emission, and removing said ammonium polyphosphate and said emission from said coalescence zone.

3. The process of claim 2, including employing said ammonia during said introducing, in an amount ranging up to about 0.3 percent by weight based on the total amount of wet-process orthophosphoric acid introduced by weight into said evaporation zone.

* * * * *